United States Patent
Sudo et al.

(10) Patent No.: US 6,252,319 B1
(45) Date of Patent: Jun. 26, 2001

(54) DISK ROTATING MECHANISM

(75) Inventors: Fumiharu Sudo; Yuji Shishido; Takashi Mochida; Shigeo Kobayashi, all of Chiba; Kentaro Soeda, Tokyo; Hiroshi Ikuta, Chiba; Mitsuhiro Ueno, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,386

(22) Filed: Jun. 28, 1999

(30) Foreign Application Priority Data

Jul. 10, 1998 (JP) .................................... 10-195314
Jan. 13, 1999 (JP) .................................... 11-006885

(51) Int. Cl.$^7$ ............................ H02K 5/24; G11B 21/22; G11B 17/04
(52) U.S. Cl. ...................... 310/67 R; 310/51; 360/98.07; 360/99.04; 360/99.05; 360/99.08
(58) Field of Search .................................... 310/89, 67 R, 310/51, 91; 360/98.07, 99.04, 99.05, 99.08, 97.01; 369/75.2, 75.1, 77.2, 271

(56) References Cited

U.S. PATENT DOCUMENTS

| | | |
|---|---|---|
| 3,109,321 | 11/1963 | Rogers . |
| 3,282,127 | 11/1966 | Deakin . |
| 3,733,923 | 5/1973 | Goodrich et al. .................. 74/573 R |
| 3,854,347 | 12/1974 | Hellerich ............................. 74/573 R |
| 4,653,169 | 3/1987 | Puszakowski ..................... 156/304.2 |
| 4,674,356 | 6/1987 | Kilgore ............................... 74/573 R |
| 5,256,037 | 10/1993 | Chatelain .......................... 417/423.7 |
| 5,391,952 | 2/1995 | Simazu et al. ..................... 310/67 R |
| 6,005,311 | * 12/1999 | Matsushima ............................ 310/51 |
| 6,005,749 | * 12/1999 | Ikuta et al. ......................... 360/99.12 |
| 6,065,368 | * 5/2000 | Sohn .................................. 74/573 R |

* cited by examiner

Primary Examiner—Tran Nguyen
(74) Attorney, Agent, or Firm—Ronald P. Kananen; Rader, Fishman & Grauer

(57) ABSTRACT

Disclosed is a disk rotating mechanism equipped with an automatic aligning mechanism in which the number of parts is reduced and in which an improvement in assembly operability and a reduction in cost are achieved. The automatic aligning mechanism includes a case body made of a non-magnetic material and formed as a flat cylinder with one end surface closed, two or more balance members provided so as to be freely movable in the inner space (movement space) of the case body, and an attracting magnet adapted to attract the balance members when the rotating mechanism is at rest or rotating at low speed, wherein the case body is supported by the spindle shaft of a spindle motor and wherein the closed end surface (table portion) thereof serves as the table portion of a turntable.

10 Claims, 4 Drawing Sheets

DISK ROTATING MECHANISM

BACKGROUND OF THE INVENTION

1. Field of the Invention

The present invention relates to a novel disk rotating mechanism. More specifically, it relates to a technique for reducing the number of parts and achieving an improvement in assembly operability in a disk rotating mechanism equipped with a so-called automatic aligning mechanism in which oscillation with the rotation of the disk is cancelled even if there is unbalance in the disk weight by causing a balance member to move in a movement space.

2. Description of the Related Art

In a disk drive device provided, for example, in a computer and adapted to perform recording and reproduction to and from a recording disk such as an optical disk or a magneto-optical disk, the recording disk is rotated by a disk rotating mechanism. This disk rotating mechanism has a spindle motor serving as a rotating means and a turntable fastened to the forward end of the spindle shaft of the spindle motor and holding the central portion of the recording disk. With respect to the recording disk rotated by this rotating mechanism, the recording and/or reproduction of information signals is performed by an optical pick-up, a magnetic head device or the like.

The recording disk consisting of an optical disk or the like may be unbalanced in weight from production, etc. When a recording disk having such unbalance in weight is rotated by the disk rotating mechanism, the recording disk will oscillate with the turntable because the center of rotation does not coincide with the center of gravity. Due to this oscillation, the focusing and tracking on the signal recording surface of the recording disk by the optical pick-up device and the following of the recording track of the recording disk by the magnetic head device cannot be performed in a satisfactory manner.

In view of this, there has been proposed a rotating mechanism having an automatic aligning function in which a plurality of balance members are movably arranged in a movement space rotated by a rotating means and in which the balance members are rotated by the rotating means and move in the movement space so that the center of gravity (composite center of gravity) of the members rotated by the rotating means and rotating members contained in the rotating means (hereinafter these rotating members will be referred to as a "composite rotating body") is situated in the rotation axis. Examples of this rotating mechanism are shown in Japanese Patent Applications No. 9-53704, 9-96231, 9-96232, 9-96233, etc., filed by the present applicant.

FIG. 1 shows a conventional example of a disk rotating mechanism equipped with an automatic aligning mechanism.

As shown in FIG. 1, a disk rotating mechanism a comprises spindle motor b, a support shaft (spindle shaft) c rotated by the spindle motor b, an automatic aligning mechanism d arranged near the upper end of the spindle shaft c, and a turntable e secured to the upper end portion of the spindle shaft c.

The spindle shaft c is rotatably supported through the intermediation of rotary bearings h with respect to a shaft support member g supported by a mechanical chassis f. A rotor case i constituting the spindle motor b is attached to the spindle shaft c, and the rotor case i is substantially formed as a cylinder with one end surface closed, a cylindrical drive magnet j being secured to the inner peripheral portion thereof.

A stator coil k is attached to the shaft support member g, and the stator coil k is arranged so as to be opposed to the drive magnet j.

A motor substrate 1 is provided on the mechanical chassis f, and the motor substrate 1 supplies electricity to the stator coil k attached to the shaft support member g.

In the spindle motor b, when drive current is supplied to the stator coil k, a magnetic field generated by the stator coil k acts on the drive magnet j, and the drive magnet j and the rotor case i are rotated with the spindle shaft c, whereby the automatic aligning mechanism d and the turntable e are rotated integrally. That is, the spindle shaft c serves as the support shaft (drive shaft) of the spindle motor b.

The turntable e comprises a centering guide portion o into which the spindle shaft c is forced and at the central portion of which a protrusion n for positioning a recording disk is formed, and a disc-like table portion p protruding from the centering guide portion o in the direction perpendicular to the axis. The centering guide portion o is formed of a synthetic resin material, and the table portion p is formed of a non-magnetic metal material, the table portion p and the centering guide portion o being formed integrally by insert molding.

The positioning protrusion n protrudes in the form of a truncated cone, and is fitted into a central hole q of the recording disk m to perform the positioning of the recording disk m. Further, a magnet r is contained in the positioning protrusion n, and attracts a chucking member (clamper member) (not shown) including a magnetic material.

An annular friction sheet s is attached to the outer peripheral edge of the table portion p, and torque can be correctly transmitted to the recording disk m placed on the table portion p.

The automatic aligning mechanism d comprises a flat cylindrical case body t formed of a non-magnetic metal material and having one end surface closed, a ring-like attraction magnet u arranged in the case body t so as to be coaxial therewith, a plurality of balance members v accommodated in the space (movement space) between the attraction magnet t and the outer peripheral wall of the case body t, and an annular yoke w attached to the attraction magnet u.

The case body t is secured to the spindle c such that the closed end surface thereof is in contact with the closed end surface of the rotor case i, whereby the turntable e side end surface of the case body t is open.

Further, the open end surface of the case body t is covered with the table portion p of the turntable e. In the disk rotating mechanism a equipped with this automatic aligning mechanism d, when a predetermined number of revolutions is attained, the balance members v are detached from the attraction magnet u and come into contact with the inner surface of the outer peripheral wall of the case body t, and the balance members v move such that the mass eccentricity of the composite rotating body is canceled, whereby alignment is effected.

However, in the above-described conventional disk rotating mechanism a, the table portion p of the turntable e is made of a metal material, and is formed integrally with the centering guide o by insert molding, so that the number of parts is large. Further, due to the insert molding, the assembly operability is rather poor, with the result that the production cost is high.

SUMMARY OF THE INVENTION

The present invention has been made with a view toward solving the above problems. Accordingly, it is an object of the present invention to provide a disk rotating mechanism in which the number of parts is reduced and the assembly operability is improved to thereby reduce the production cost.

To achieve the above object, there is provided, in accordance with the present invention, a disk rotating mechanism comprising an automatic aligning mechanism composed of a flat cylindrical case body formed of a non-magnetic material and having one end surface closed, two or more balance members movably provided in the interior of the case body, and an attracting magnet attracting the balance members when the mechanism is at rest or operating at low speed, wherein the case body is supported by a spindle shaft of a spindle motor and wherein the closed end surface thereof serves as a table portion of the turntable.

Thus, in the disk rotating mechanism of the present invention, the closed end surface of the case body formed of a non-magnetic material serves as the table portion of the turntable, so that there is no need for a metal table portion which has conventionally served as the table portion of the turntable, and there is no need to perform insert molding to form the metal table portion integrally with the centering guide portion, which has conventionally been necessary, so that it is possible to reduce the number of parts and achieve a reduction in cost.

DESCRIPTION OF THE PREFERRED EMBODIMENTS

Embodiments of the disk rotating mechanism of the present invention will now be described with reference to the accompanying drawings. In the embodiments described below, the present invention is applied to the disk rotating mechanism of a disk drive device for performing recording and reproduction to and from a recording disk such as an optical disk or a magneto-optical disk.

Figure 1:
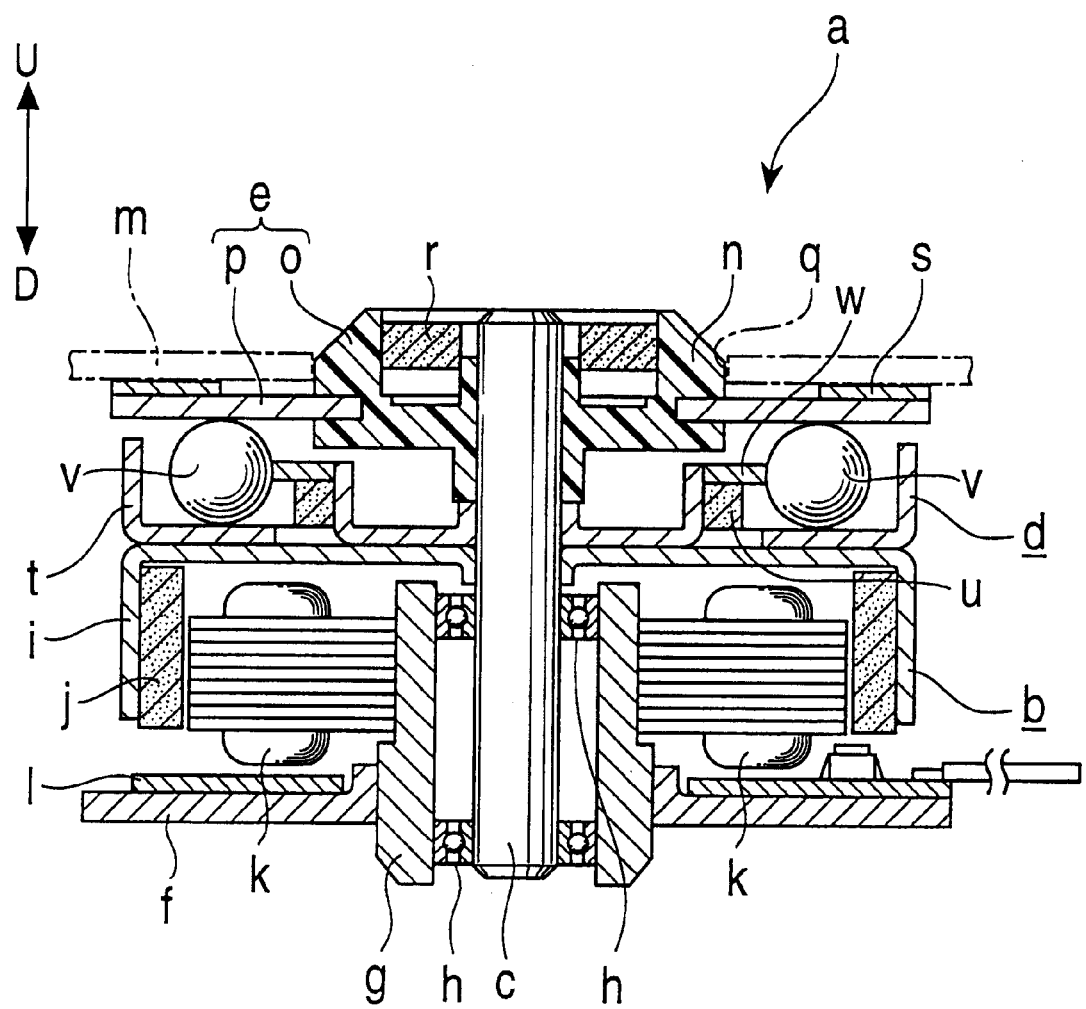
FIG. 1 is an enlarged longitudinal sectional view showing a conventional disk rotating mechanism.
Figure 2:
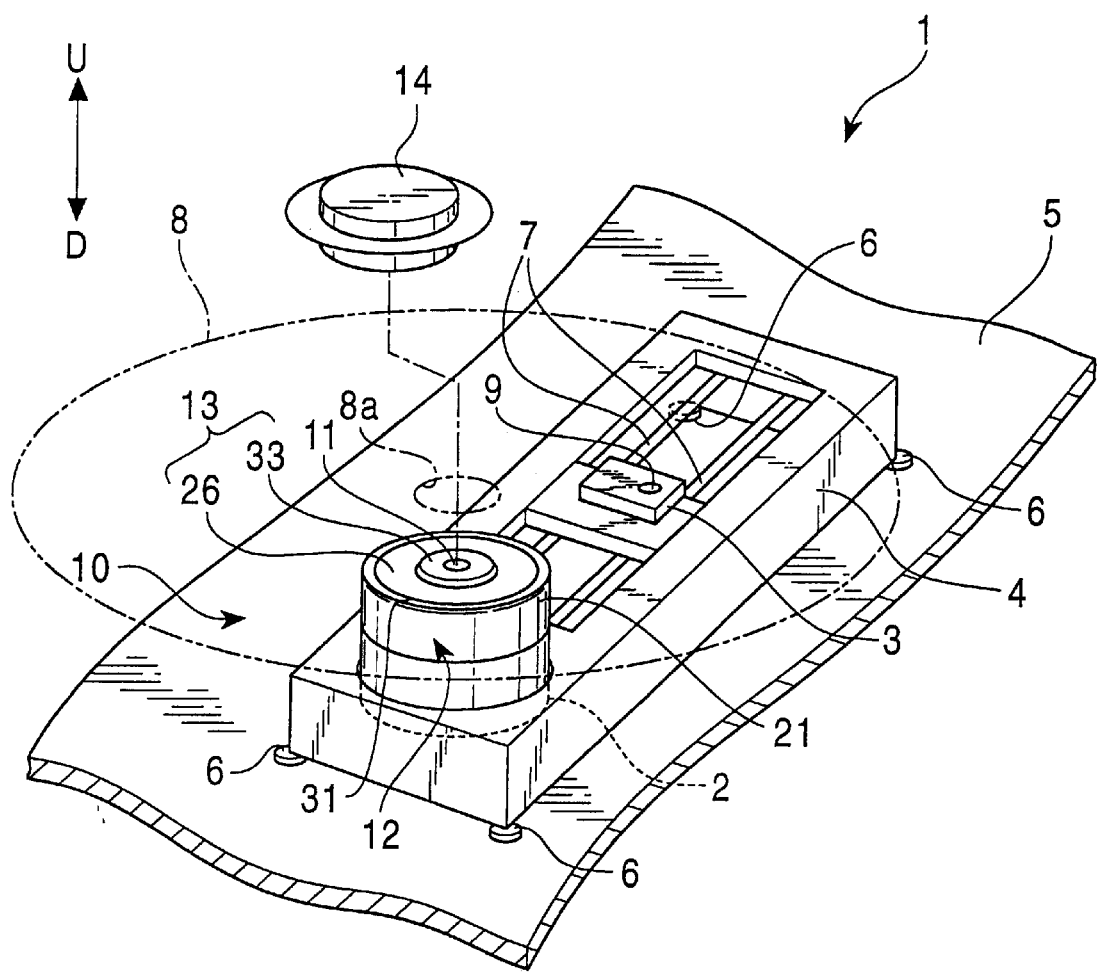
FIG. 2 is a schematic perspective view of a disk drive device using a disk driving mechanism according to an embodiment of the present invention.

In FIG. 2, a disk drive device 1 comprises a mechanical chassis 4 on which a spindle motor 2 serving as the rotating means and an optical pick-up device 3 are placed, a base chassis 5, and a plurality of dampers 6 float-supporting the mechanical chassis 4 with respect to the base chassis 5.

The optical pick-up device 3 is supported by the mechanical chassis 4 through guide shafts 7 so as to be radially movable with respect to a recording disk 8 attached to a turntable. The optical pick-up 3 has a light source such as a laser diode (not shown) and a photo detector, and applies a laser beam from the light source to the recording disk 8 through an objective lens 9 and, further, detects the reflection of the laser beam from the recording disk 8 by the photo detector.

A disk rotating mechanism 10 according to the first embodiment comprises the spindle motor 2, an automatic aligning mechanism 12 arranged near the upper end of a spindle shaft 11 rotated by the spindle motor 2, a turntable 13 fastened to the upper end portion of the spindle shaft 11, and a chucking pulley 14 holding the recording disk 8 in cooperation with the turntable 13. In the drawings, the arrow U and D indicate upward and downward directions, respectively.

Figure 3:
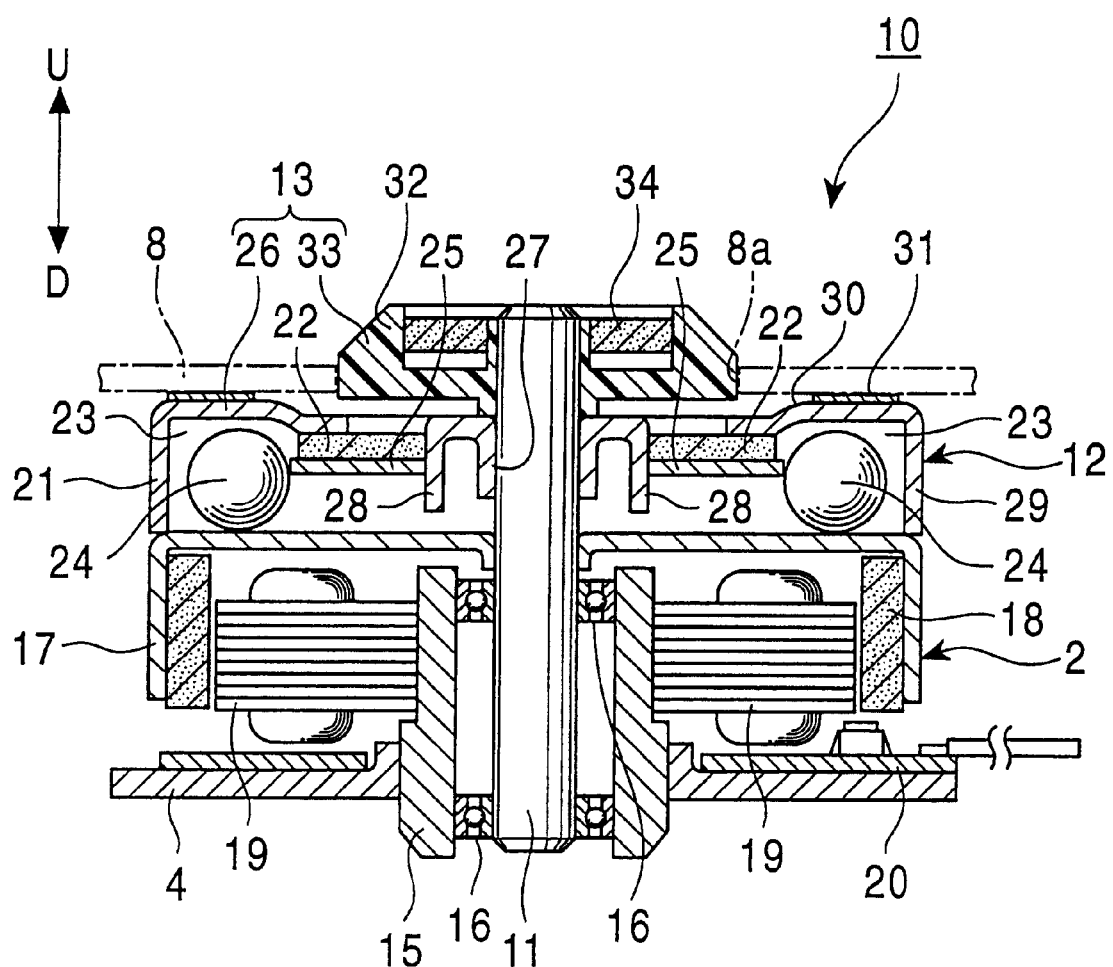
FIG. 3 is an enlarged longitudinal sectional view showing a disk rotating mechanism according to a first embodiment.

In FIG. 3, the spindle shaft 11 is supported by a shaft support member 15 supported by the mechanical chassis 4 through bearings 16 so as to be axially rotatable. A rotor case 17 constituting the spindle motor 2 is attached to the spindle shaft 11, and the rotor case 17 is formed substantially as a cylinder with one end surface (the upper end surface) closed, a cylindrical driving magnet 18 being fastened to the inner peripheral surface thereof.

A stator coil 19 is attached to the shaft support member 15, and the stator coil 19 is arranged so as to be opposed to the driving magnet 18.

The mechanical chassis 4 is provided with a motor substrate 20, which supplies electricity to the stator coil 19 mounted to the shaft support member 15.

In the spindle motor 2, when a drive current is supplied to the stator coil 19, a magnetic field generated by the stator coil 19 acts on the driving magnet 18, and the driving magnet 18 and the rotor case 17 are rotated with the spindle shaft 11, whereby the automatic aligning mechanism 12 and a turntable 13 are rotated integrally. That is, the spindle shaft 11 serves as the support shaft (drive shaft) of the spindle motor 2.

The automatic aligning mechanism 12 is made of a non-magnetic material and comprises a flat cylindrical case body 21 with one end surface (upper end surface) closed, a ring-like attracting magnet 22 arranged in the case body 21 so as to be coaxial therewith, a plurality of balance members 24 accommodated in the space (movement space) 23 between the attracting magnet 22 and the outer peripheral wall of the case body 21, and an annular yoke 25 mounted to the attracting magnet 22.

The case body 21 comprises a closed (upper) end surface 26, a cylindrical shaft fitting portion 27 into the central portion of which the spindle shaft 11 is fitted, four cut-and-bent portions 28 formed near the shaft fitting portion 27 by cutting and bending downward, and an outer peripheral wall 29 bent downward substantially at right angles from the outer peripheral edge of the closed end surface 26. This case body 21 is formed by stamping. The closed end surface 26 of the case body 21, which serves as the table portion of the turntable 13 as described below, will be hereinafter referred to as the table portion.

Near the outer peripheral edge of the table portion 26, there is formed a step portion 30 annularly extending such that the table portion is raised from the inner periphery toward the outer periphery, whereby the rigidity of the table portion 26 is enhanced and, at the same time, the movement space 23 is enlarged, whereby it is possible to accommodate larger balance members 24.

A friction sheet 31 consisting of an annular sheet-like member is attached to the portion of the upper surface of the table portion 26 which is on the outer side of the step portion 30, whereby torque is accurately transmitted to the recording disk 8 placed on the table portion 26.

The cut-and-bent portions 28 are formed at substantially equal circumferential intervals, and abut the inner peripheral edge of the ring-like attracting magnet 22. Thus, the attracting magnet 22 is arranged inside the case body 21 so as to be coaxial therewith.

This case body 21, with its open end surface facing downward, is placed from above on the rotor case 17, and the spindle shaft 11 is fitted into it to thereby secure it in position. The open end surface of the case body 21 is closed by the upper surface of the rotor case 17, whereby a movement space 23 for allowing the balancers 24 to move is defined. When a sheet packing (not shown) or the like is arranged where the open-side peripheral edge of the outer peripheral wall 29 of the case body 21 is in contact with the rotor case 17, a dust-proof effect is obtained.

The turntable 13 comprises a centering guide portion 33 into which the spindle shaft 11 is fitted and in the central portion of which a positioning protrusion 32 for effecting the positioning of the recording disk 8, and the table portion 26 on which the recording disk 8 is placed, and the table portion 26 is formed, as described above, by the closed end surface of the case body 21 of the automatic aligning mechanism 12.

Thus, to form the turntable 13, the spindle 11 is fitted into the case body 21 and fixed therein, and then the spindle 11 is fitted into the centering guide portion 33 and fixed therein.

The positioning protrusion 32 of the centering guide portion 33 protrudes substantially in the form of a truncated cone and is fitted into the central hole 8a of the recording disk 8 to effect the positioning of the recording disk 8. Further, a magnet 34 is embedded in the positioning protrusion 32, and attracts a magnetic member (not shown) provided in the chucking pulley 14, whereby the recording disk 8 is held between the chucking pulley and the table portion 26 to thereby effect chucking.

In the disk rotating mechanism 10 of this embodiment, the closed end surface of the case body 21 of the automatic aligning mechanism 12 serves as the table portion 26 of the turntable 13, so that there is no need to provide a separate table portion p which has been necessary.

In this disk drive device 1, due to the provision of the automatic aligning mechanism 12, if there is any unbalance in weight in the recording disk 8, the balance members 28 are separated from the attracting magnet 22 due to centrifugal force when the spindle motor 2 attains a predetermined speed, and they come into contact with the inner surface of the outer peripheral wall of the case body 21, each balance member 24 moving so as to cancel the decentering of the composite rotating body, whereby the decentering can be canceled and a stable rotation free from oscillation is realized.

While in the above-described embodiment automatic alignment is executed on the composite rotating body when a recording disk 8 having unbalance is attached to the turntable, also in a case in which a member of the composite rotating body other than the recording disk 8 has unbalance, automatic alignment is executed by the disk rotating mechanism 10, whereby the oscillation during operation can be restrained.

Further, while in the above-described embodiment the balance members 24 are spherical, this should not be construed restrictively. The balance members 24 may be of any shape as long as they can move in the movement space; for example, they may also be cylindrical or barrel-shaped.

Next, a disk rotating mechanism 10A according to the second embodiment will be described with reference to FIG. 4. The components which are the same as those of the disk rotating mechanism 10 of the first embodiment are indicated by the same reference numerals, and a description thereof will be omitted.

The disk rotating mechanism 10A of the second embodiment comprises a spindle motor 2A, an automatic aligning mechanism 12A arranged near the outer periphery of a rotor case 35 rotated by the spindle motor 2A, and a turntable 13A consisting of the upper surface of a part of the rotor case 35.

The rotor case 35 of the spindle motor 2A consists of a non-magnetic member and is substantially in the form of a flat cylinder with one end surface closed.

At the center of the rotor case 35, an upwardly protruding cylindrical boss portion 36 is integrally formed, and the spindle shaft 11 is fitted into the boss portion 35 and fixed therein. Further, a ring-like yoke member 37 consisting of a magnetic substance and having a crank-shaped sectional configuration is attached to the rotor case 35 at a position on the inner side of the outer peripheral wall 35a of the rotor case 35, whereby a space 38 is defined between the vertical wall 37a of the yoke member 37 and the outer peripheral wall 35a of the rotor case 35, the space 38 serving as a movement space for the automatic alignment mechanism 12A. Thus, in this embodiment, the outer peripheral portion of the rotor case 35 constitutes a part of the case body of the automatic aligning mechanism 12A.

The lower surface of the movement space 38 is covered with the lower horizontal wall 37b of the yoke member 37, and the movement space 38 is substantially a closed space. Further, a ring-like attracting magnet 39 is attached to the lower horizontal wall 37b of the yoke member 37 and, further, a sheet material 40 with a satisfactory slip is attached to the upper surface of the attracting magnet 39. Instead of the sheet member 40, it is possible to form a thin protective layer on the surface of the attracting magnet 39 by evaporation or the like.

The inner peripheral surface 41 of the outer peripheral wall 35a of the rotor case 35 is formed as a recessed rounded surface having a relatively small curvature, and the curvature of this recessed rounded surface 41 is smaller than the curvature of balance members 42 accommodated in the movement space 38. Thus, when the balance members 42 are in contact with the recessed rounded surface 41, they are in point contact with each other.

The rotor case 35 may be formed of other non-magnetic materials such as aluminum, brass or synthetic resin, and is formed by an appropriate method such as stamping, machining or resin molding.

A cylindrical driving magnet 18 is fastened to the inner peripheral surface of the vertical wall 37a of the yoke member 37, and the driving magnet 18 faces stator coils 19.

The closed end surface (upper end surface) 43 of the rotor case 35 serves as the table portion of a turntable 13A as described below, so that the closed end surface 43 will be hereinafter referred to as the table portion.

Figure 4:
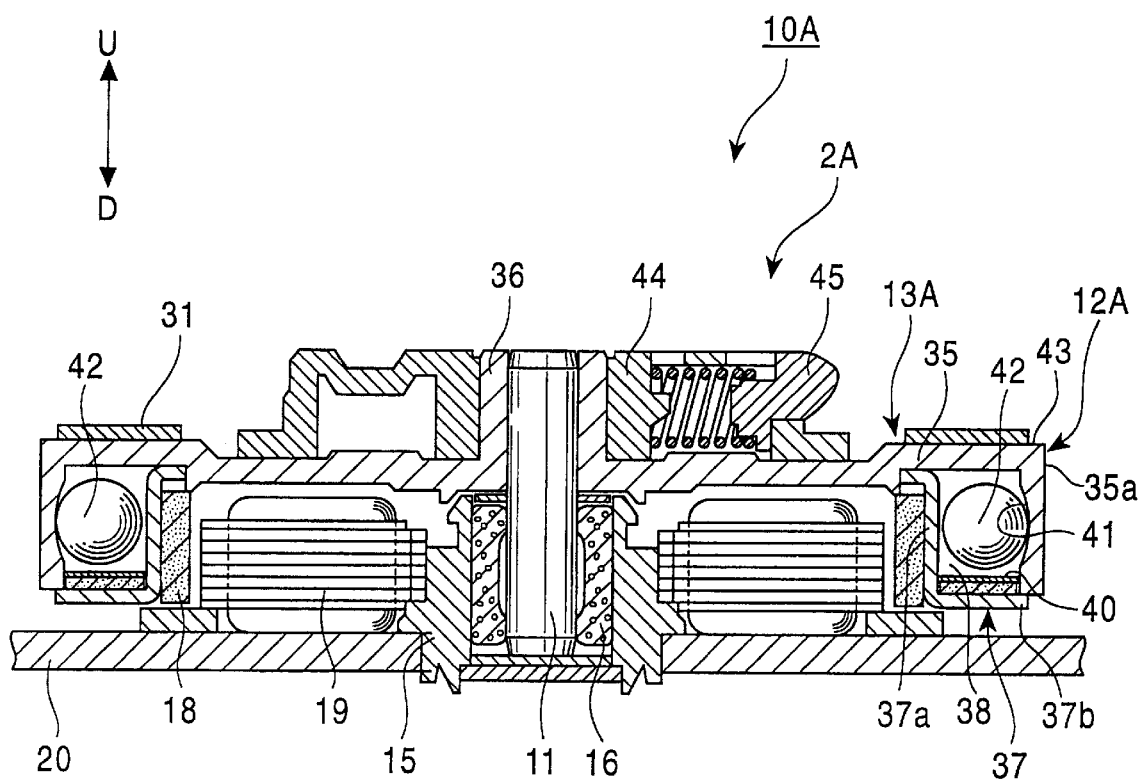
FIG. 4 is an enlarged longitudinal sectional view showing a disk rotating mechanism according to a second embodiment.

The boss portion 36 of the rotor case 35 is fitted into a disc-like centering member 44 whose diameter is substantially the same as or somewhat smaller than the central hole 8a of the recording disk 8, and the centering member 44 is provided with three chucking claws 45 (only one of them is shown in FIG. 4). Due to the chucking claws 45, the recording disk 8 is pressed against the table portion 43 of the recording disk 8, thereby effecting chucking.

When the spindle motor 2A attains a predetermined speed of rotation, the balance members 42 are separated from the attracting magnet 39 by centrifugal force and climb up the recessed rounded surface 41 to be positioned at the portion of the movement space 38 which has the largest diameter and, in this condition, move within the movement space, whereby automatic alignment is effected.

When the balance members 42 are positioned on the recessed rounded surface 41, the balance members 42 are in point contact with the recessed rounded surface 41, so that the frictional resistance is low, and the rolling friction coefficient of the balance members 42 is small, whereby the automatic alignment is effected smoothly.

Since the sheet member 40 is attached to the upper surface of the attracting magnet 39, the balance members 42 are not brought into direct contact with the attracting magnet 39, and the rolling friction coefficient is small, so that the automatic alignment is further smoothened.

Further, since the balance members 42 do not roll on the attracting magnet 39, no dust (magnetic powder) is generated, so that it is possible to keep the interior of the movement space 38 clean. This also helps to smoothen the automatic alignment.

In the disk rotating mechanism 10A of the second embodiment, the closed end surface of the rotor case 35 serves as the table portion of the turntable 13A, so that, as in the disk rotating mechanism 10 of the first embodiment, there is no need to provide a separate table portion p, which has conventionally been necessary. Furthermore, since the automatic aligning mechanism 12A is positioned outside the spindle motor 2A, and a part of the rotor case 35 constitutes a part of the case body of the automatic aligning mechanism 12A, it is possible to achieve a reduction in the axial size, thereby achieving a reduction in the thickness of the device.

Furthermore, since the inner peripheral surface of the outer peripheral wall 35a of the rotor case 35 is formed as a recessed rounded surface on which the balance members 42 roll directly, it is possible to achieve a reduction in the number of parts and the radial size as compared to a conventional construction in which a ring-like race member is formed as a member separate from the case body (the rotor case 35 in this embodiment) and in which the race member is fitted into the case body.

Further, in the construction in which the race member is formed as a member separate from the case body, it is necessary to provide a clearance for allowing the race member to be fitted into the case body, and it is difficult to maintain the concentricity with respect to the case body. In the disk rotating mechanism 10A of the second embodiment, in contrast, it is possible to make the rolling surface for the balance members 42 concentric with the spindle shaft 11, so that it is possible to achieve an improvement in the accuracy of the automatic aligning mechanism 12A.

In this disk rotating mechanism 10A, any unbalance in the weight of the recording disk can be canceled by the automatic aligning mechanism 12A, whereby it is possible to realize a stable rotation free from oscillation.

The specific configuration and construction of each part as described above with reference to the above embodiments are only shown as an example of the form in which the present invention is to be carried out, and do not restrict the technical scope of the present invention.

What is claimed is:

1. A disk rotating mechanism comprising
a rotation shaft;
a turntable which is mounted to the rotation shaft and on which a disc-shaped recording medium is placed;
a spindle motor for rotating the rotation shaft, and
automatic aligning means for causing the center of gravity of a composite rotating body consisting of the rotation shaft, the turntable, the spindle motor, and the disc-shaped recording medium to be positioned in the rotation axis during rotation;
wherein said automatic aligning means comprises a case body made of a non-magnetic material and formed as a flat cylinder with one end surface closed, a plurality of balance members freely moving in the inner space of the case body, and an attracting magnet attracting the balance members when the rotation is stopped, the closed end surface of the case body constituting the table portion of the turntable; wherein
said automatic aligning means is provided in the outer periphery with respect to said spindle motor and wherein the case body is formed integrally with said rotor case of said spindle motor; and wherein
the inner peripheral surface of the case body of said automatic aligning means is formed as a round recessed surface; and wherein
an inner peripheral surface formed as a recessed rounded surface of said outer periphery, and having a smaller curvature than that of said balance members enclosed in said movement space;
so that when said balancing members are in contact with said recessed rounded surface, said balance members are also in point contact with each other.

2. A disk rotating mechanism according to claim 1, wherein, in said automatic aligning means, the open end surface of the case body and a rotor case of said spindle motor define said inner space.

3. A disk rotating mechanism according to claim 1, wherein, in said automatic aligning means, said attracting magnet is provided on the bottom surface of said inner space.

4. A disk rotating mechanism according to claim 3, wherein, in said automatic aligning means, a protective layer is formed on the surface of said attracting magnet.

5. A disk rotating mechanism according to claim 1, further comprising:
said case body being formed of a non-magnetic material selected from a group consisting of: aluminum, brass, and synthetic resin.

6. A disk rotating mechanism according to claim 1, further comprising:
said case body being formed by either stamping, machining, or resin molding.

7. A disk rotating mechanism according to claim 1, further comprising:
a sheet member having a satisfactory slip, attached to the upper surface of said attracting magnet.

8. A disk rotating mechanism according to claim 1, further comprising:
said balance members directly roll upon, and are in point contact with, said round recessed surface.

9. A disk rotating mechanism according to claim 8, further comprising:
said round recessed surface for said balance members being concentric with said spindle shaft.

10. A disk rotating mechanism according to claim 1, further comprising:
said balance members being formed in a shape selected from a group consisting of: spherical, cylindrical, and barrel.

* * * * *